United States Patent
Yuan et al.

(10) Patent No.: US 9,063,288 B2
(45) Date of Patent: Jun. 23, 2015

(54) OPTICAL CIRCUIT SWITCH WITH INTEGRAL CIRCULATORS

(71) Applicant: CALIENT Technologies, Inc., Goleta, CA (US)

(72) Inventors: Shifu Yuan, Camarillo, CA (US); Nan Luo, Goleta, CA (US); Changbao Ma, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 22 days.

(21) Appl. No.: 13/904,915

(22) Filed: May 29, 2013

(65) Prior Publication Data

US 2014/0355933 A1    Dec. 4, 2014

(51) Int. Cl.
| | |
|---|---|
| *G02B 6/26* | (2006.01) |
| *G02B 6/42* | (2006.01) |
| *G02B 6/27* | (2006.01) |
| *G02B 6/35* | (2006.01) |
| *G02B 6/293* | (2006.01) |

(52) U.S. Cl.
CPC ............ *G02B 6/2746* (2013.01); *G02B 6/3584* (2013.01); *G02B 6/29373* (2013.01); *G02B 6/3518* (2013.01); *G02B 6/3556* (2013.01)

(58) Field of Classification Search
CPC . G02B 6/2746; G02B 6/29373; G02B 6/3518
USPC .................... 385/16–18, 20, 21, 24
See application file for complete search history.

(56) References Cited

U.S. PATENT DOCUMENTS

| | | |
|---|---|---|
| 5,037,173 A | 8/1991 | Sampsell et al. |
| 6,097,860 A | 8/2000 | Laor |
| 6,411,751 B1 | 6/2002 | Giles et al. |
| 6,556,739 B1 | 4/2003 | Kruglick et al. |
| 6,567,574 B1 | 5/2003 | Ma et al. |
| 6,571,029 B1 | 5/2003 | Kruglick et al. |
| 6,690,885 B1 | 2/2004 | Aksyuk et al. |
| 6,798,992 B1 | 9/2004 | Bishop et al. |
| 6,819,815 B1 | 11/2004 | Corbalis et al. |
| 6,823,101 B2 | 11/2004 | Gates, II et al. |
| 6,836,381 B2 | 12/2004 | Giles et al. |
| 7,676,125 B2 | 3/2010 | Zheng et al. |
| 2001/0000131 A1* | 4/2001 | Cao .............................. 359/494 |

\* cited by examiner

*Primary Examiner* — Ryan Lepisto
(74) *Attorney, Agent, or Firm* — SoCal IP Law Group LLP; John E. Gunther; Steven C. Sereboff

(57) ABSTRACT

Optical circuit switches and switching methods are described. A first optical circulator may form a first plurality of bidirectional optical beams from a first plurality of input optical beams and a corresponding first plurality of output optical beams. Each bidirectional optical beam may consist of the corresponding input optical beam and the corresponding output optical beam overlaid to follow, in opposing directions, a common optical path. A first mirror array may be disposed to reflect the first plurality of bidirectional optical beams.

10 Claims, 5 Drawing Sheets

FIG. 2A
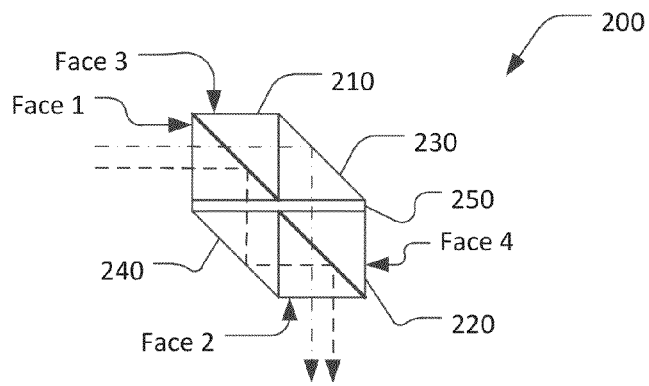
FIG. 2B
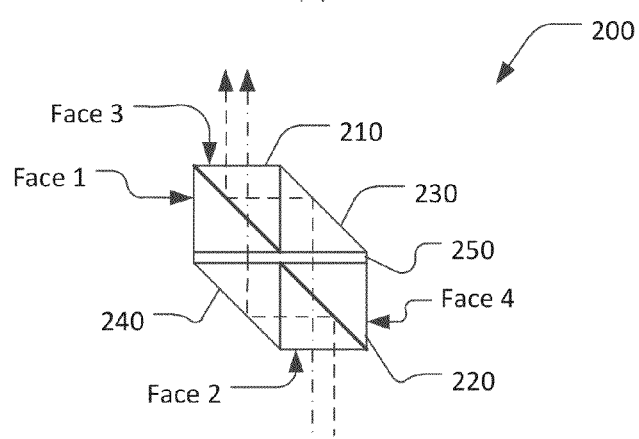
FIG. 2C
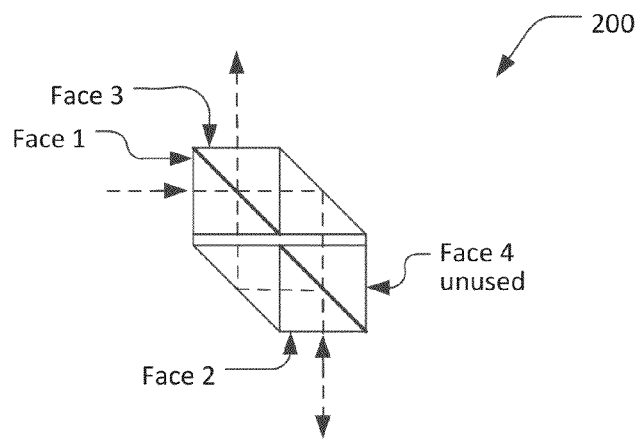
FIG. 2
Prior Art
© 2013 Calient Technologies © 2013 Calient Technologies

OPTICAL CIRCUIT SWITCH WITH INTEGRAL CIRCULATORS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

DESCRIPTION OF THE DRAWINGS

FIG. 2A is an optical schematic diagram of a free space optical circulator.

FIG. 2B is another optical schematic diagram of a free space optical circulator.

FIG. 2C is another optical schematic diagram of a free space optical circulator.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Figure 1:
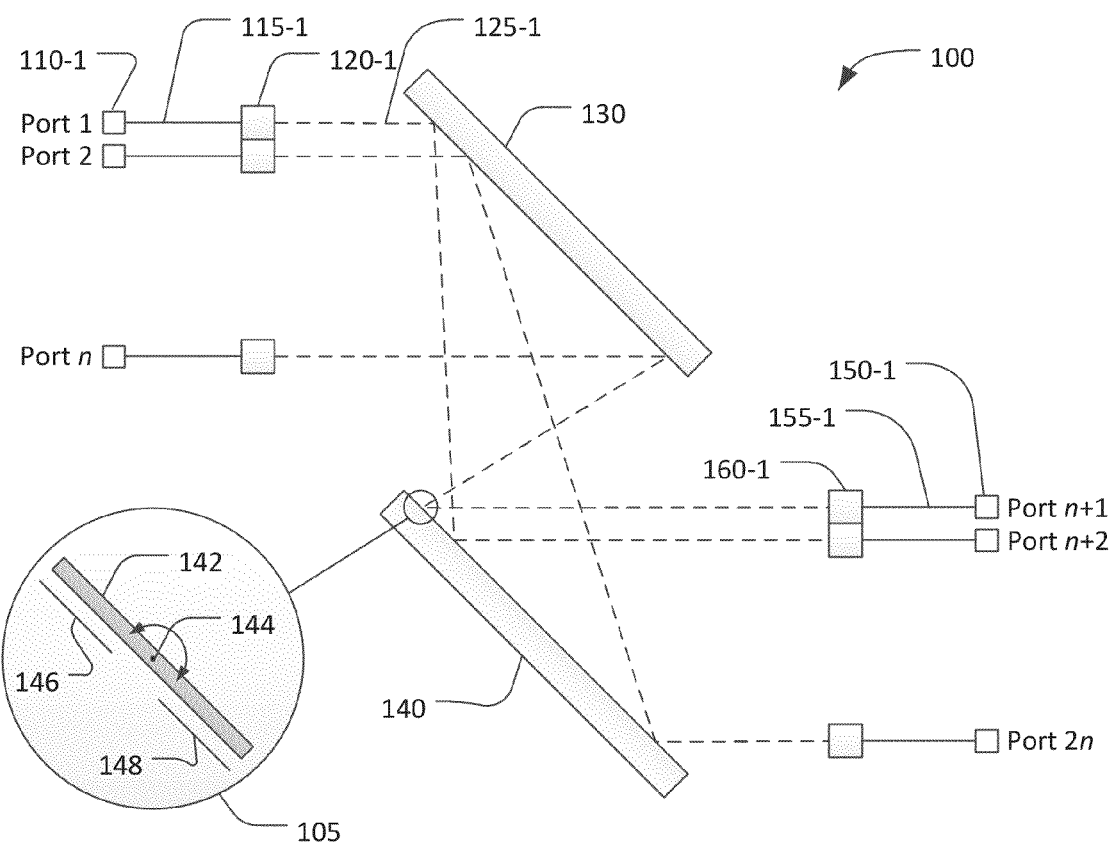
FIG. 1 is an optical schematic diagram of an optical circuit switch.

Referring now to FIG. 1, an optical circuit switch 100 may be configured to connect a first group of n ports (where n is an integer greater than 1), labeled Port 1 to Port n, to a second group of n ports, labeled Port n+1 to Port 2n. More specifically, the optical circuit switch 100 may selectively connect up to n pairs of ports, where each pair of ports includes a port from the first group and a port from the second group. For ease of description, the first group of ports may be considered as input ports and the second group of ports may be considered as output ports. However, the optical circuit switch 100 may be capable of transferring optical signals in either direction between the first group of ports and the second group of ports.

Each of the input ports (Port 1 to Port n) may include a connector (of which only the connector 110-1 is identified) to receive an optical fiber cable (not shown). Each connector may be coupled by a respective optical fiber (of which only optical fiber 115-1 is identified) to a respective collimator lens (of which only collimator lens 120-1 is identified). Each collimator lens may convert an optical signal from the respective optical fiber into a collimated optical beam (of which only optical beam 125-1 is identified) in free space. Free space optical beams are shown in FIG. 1 as dashed lines. The optical fibers may terminate in a fiber block (not shown), such as, for example, the fiber block described in U.S. Pat. No. 6,819,824. The collimator lenses may be elements of a lens array, such as, for example, the lens array described in U.S. Pat. No. 6,449,098.

Each free space optical beam, such as optical beam 125-1 may be directed onto a first mirror array 130. The first mirror array 130 may include n mirrors with a one-to-one correspondence between optical beams and mirrors, such that each optical beam is directed onto a respective mirror. To improve the manufacturing yield of the first mirror array 130, the first mirror array 130 may include more than n mirrors, in which case the n optical beams may directed to a subset of n mirrors that are known to be fully functional.

A second mirror array 140 may be disposed to intercept some or all of the optical beams reflected from the first mirror array 130. Although not shown in FIG. 2, additional optical elements, such as a reflector or a lens, may be interposed along the path of the optical beams between the first mirror array and the second mirror array. Each mirror on the first mirror array 130 may direct the respective optical beam to a selected mirror of the second mirror array 140. The mirrors of the second mirror array 140 may direct the respective optical beam to a corresponding collimator lens (of which only collimator lens 160-1 is identified). Each collimator lens may focus the optical beam into a respective optical fiber (of which only optical fiber 155-1 is identified) that conveys the optical signal to a respective port connector (of which only connector 150-1 is identified).

The optical circuit switch 100 may create a one-to-one connection between some or all of the input port and a corresponding number of the output ports. For example, as shown in FIG. 1, Port 1 is connected to port n+2, port 2 is connected to port 2n, and port n is connected to port n+1.

The detail view 105 shows a simplified schematic diagram of a mirror from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element may be rotated by electrostatic attraction between the mirror element and either a first electrode 146 or a second electrode 148. For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction.

In the simplified example of FIG. 1, the mirror element 142 rotates about a single axis defined by the torsion bars. Either or both of the first mirror array 130 and the second mirror array may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the detail view 105. For example, U.S. Pat. No. 6,628,041 describes a MEMS mirror array having two-axis mirror motion and comb actuators.

FIG. 2A is an optical schematic diagram of an optical circulator 200 that inputs and outputs free-space optical beams (i.e. optical beams that are not confined in waveguides). The optical circulator 200 includes first and second polarizing beam splitter (PBS) cubes 210, 220, first and second prisms 230, 240, and a non-reciprocal polarization rotator 250. The optical circulator 200 has first, second, third, and fourth input/output faces, identified as Face 1 to Face 4, respectively.

Each PBS cube 210, 220 may consist of two 45°×45°×90° prisms. A polarization splitting structure is formed on the hypotenuse face of one prism, and the two hypotenuse faces are bonded together to form a cube. The polarization splitting structure on the hypotenuse face may be a multiplayer dielectric coating, in which case each PBS cube 210, 220 may be referred to as a "MacNeille prism". The polarization splitting structure on the hypotenuse face may be a wire grid polarizer or some other structure.

The polarization state of a light beam passing through the non-reciprocal polarization rotator 250 may be rotated differently depending on the direction of the light beam. In example of FIG. 2, the non-reciprocal polarization rotator 250 does not rotate the polarization direction of light beams passing through from top to bottom (as shown in FIG. 2A), but does rotate the polarization direction of light beams passing from bottom to top by 90 degrees. The non-reciprocal polarization rotator 250 may consist of, for example, a half-wave plate configured to rotate polarization direction by 45 degrees reciprocally and a 45-degree Faraday rotator. The effects of the half-wave plate and the Faraday rotator may be subtractive for light passing from top to bottom (i.e. no net polarization rotation) and additive for light passing from bottom to top (i.e. 90-degree net polarization rotation).

A light beam entering at Face 1 may be considered to have a p-polarized component having a polarization direction lying in the plane of FIG. 2A and an s-polarized component having a polarization direction orthogonal to the plane of FIG. 2A. In FIG. 2A and FIG. 2B, p-polarized components are shown as dot-dash lines and s-polarized components are shown as dashed lines. The p-polarized component of the light beam entering at Face 1 is transmitted through the hypotenuse of the first PBS cube 210, internally reflected from the hypotenuse of the first prism 230, transmitted through the non-reciprocal polarization rotator 250 without change, and transmitted through the hypotenuse of PBS the second PBS cube 220. Thus the p-polarized component exits the optical circulator 200 at Face 2. The s-polarized component of the light beam entering at Face 1 is reflected from the hypotenuse of the first PBS cube 210, internally reflected from the hypotenuse of the second prism 240, transmitted through the non-reciprocal polarization rotator 250 without change, and reflected from the hypotenuse of PBS the second PBS cube 220. Thus the s-polarized component also exits the optical circulator 200 at Face 2. The paths lengths through the circulator 700 for the p-polarized component and the s-polarized component may be identical.

FIG. 2B is another optical schematic diagram of the optical circulator 200 with a free-space optical beam entering the circulator at Face 2. The p-polarized component of the light beam entering at Face 2 is transmitted through the hypotenuse of the second PBS cube 220, transmitted through the non-reciprocal polarization rotator 250 incurring a 90-degree rotation in polarization direction, internally reflected from the hypotenuse of the first prism 230, and reflected from the hypotenuse of the first PBS cube 210. Thus the p-polarized component entering at Face 2 exits the optical circulator 200 at Face 3. The s-polarized component of the light beam entering at Face 2 is reflected from the hypotenuse of the second PBS cube 220, internally reflected from the hypotenuse of the second prism 240, transmitted through the non-reciprocal polarization rotator 250 incurring a 90-degree rotation of polarization direction, and transmitted through the hypotenuse of PBS the first PBS cube 210. Thus the s-polarized component entering at Face 2 also exits the optical circulator 200 at Face 3.

FIG. 2C illustrates that the optical circulator 200 can be used to overlay two unidirectional optical beams (i.e. an input beam at Face 1 and an output beam at Face 3) to form a single bidirectional optical beam at Face 2. In this context, a "bidirectional optical beam" is defined to be a pair of optical beams proceeding in opposing direction along a common optical path. Exact superimposition of the pair of optical beams is not required. The beam width of the two component beams of a bidirectional optical beam may differ slightly, and the optical axes of the two component beams may be slightly offset. An optical beam incident on Face 1 of the optical circulator 200 will exit at Face 2. An optical beam incident at Face 2, coincident with the exiting beam, will exit the optical circulator at Face 3.

Thus the function of the optical circulator 200 may be described as overlaying the two unidirectional beams that enter and exit the optical circulator at Faces 1 and 3, respectively, to form a single bidirectional beam that enters and exits at Face 2 of the optical circulator. The function of the optical circulator 200 may also be described as separating the directional components of a bidirectional beam that enters and exits at Face 3 of the optical circulator into two unidirectional beams that enter and exit at Face 1 and Face 2, respectively. The distinction between "overlaying" and "separating" beams is strictly semantic, and the optical circulator 200 will perform the "overlaying" and "separating" functions simultaneously. The optical circulator 200 has a fourth Face, Face 4, which is not used in the optical switches described in this patent. It can be shown the light entering the optical circulator 200 at Face 3 will exit at Face 4, and light entering the optical circulator 200 at Face 4 will exit at Face 1.

Figure 3:
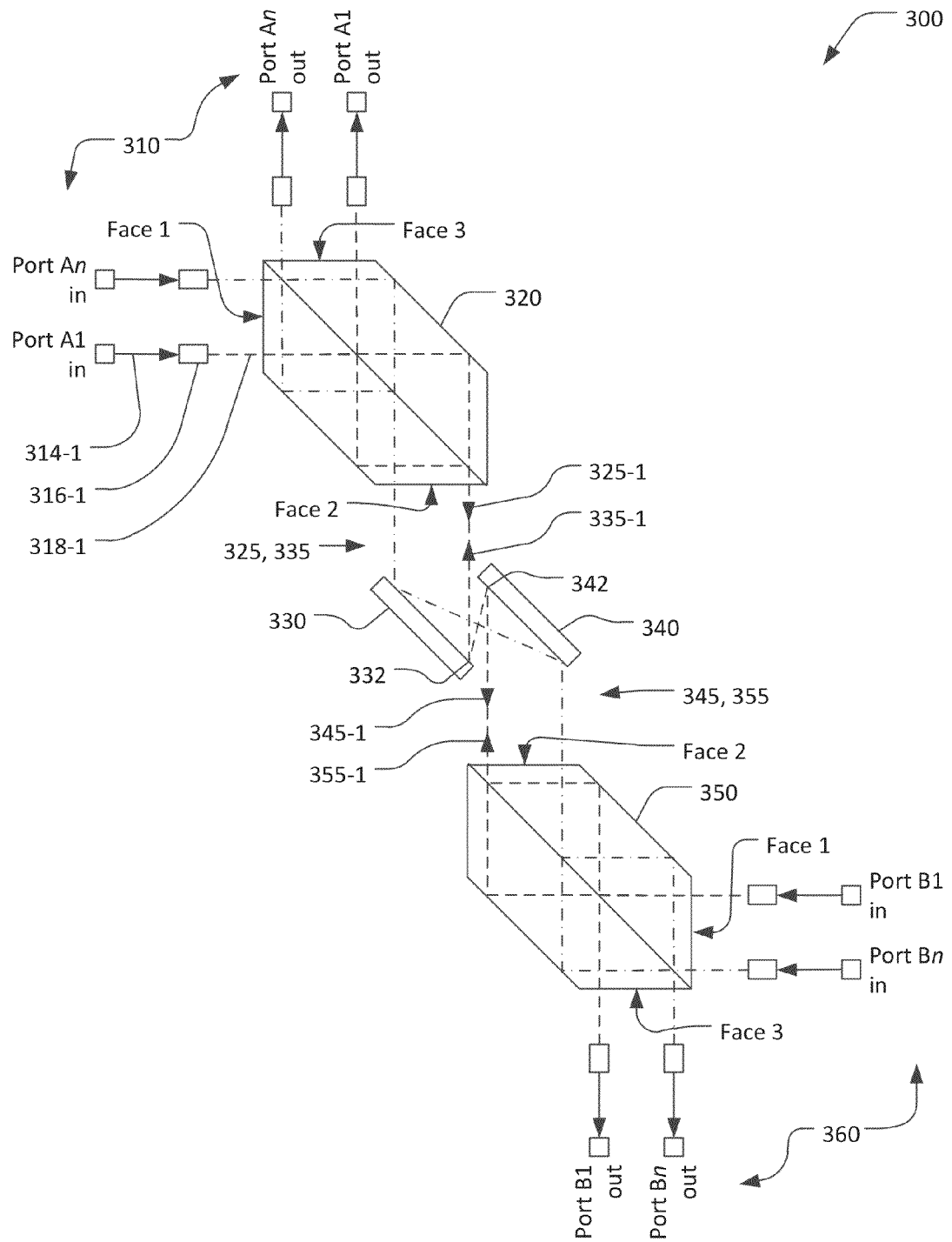
FIG. 3 is an optical schematic diagram of an optical circuit switch with integral optical circulators.

Referring now to FIG. 3, an optical circuit switch 300 may be used to connect any of a first group, or A group, of n bidirectional optical ports 310 to a selected one of a second group, or B group, of n bidirectional optical ports 360. The A group of bidirectional optical ports 310 may include n input connectors, identified as "Port A1 in" to "Port An in". The A group of bidirectional optical ports 310 may also include n output connectors, identified as "Port A1 out" to "Port An out". Each A port consists of an input connector and the corresponding output connector. Each input and output connector may be configured to mate with a fiber optical cable (not shown).

Similarly, the B group of bidirectional optical ports 360 may include n input connectors, identified as "Port B1 in" to "Port Bn in". The B group of bidirectional optical ports 360 may also include n output connectors, identified as "Port B1 out" to "Port Bn out". Each B port consists of an input connector and the corresponding output connector.

The discussion of the optical circuit switch 300 with first consider optical signals input at the Group A ports at connectors Port A1 in to Port An in., Each A group input connector may be coupled by an input optical fiber, of which only the input optical fiber 314-1 is identified, to a respective input optical collimator, of which only input optical collimator 316-1 is identified. Each input optical collimator may collimate the light from the respective optical fiber into an input optical beam, of which only input optical beam 318-1 in identified. Optical beams are shown in FIG. 3 as dashed lines. n parallel input optical beams may be incident on the Face 1 of the first optical circulator 320. As previously described with respect to FIG. 2A, the n optical beams incident on Face 1 will exit the first optical circulator 320 at Face 2 as a first set of optical beams 325, of which only the optical beam 325-1 is individually identified. For specific example, the optical signal input at Port A1 in may be collimated by the optical collimator 316-1 to form the optical beam 318-1 which is incident on face 1 of the first optical circulator 320. The beam may propagate through the optical circulator as previously described and exit face 2 of the first optical circulator 320 as the optical beam 325-1.

Each of the n optical beams 325 exiting Face 2 of the first optical circulator may be incident on a respective mirror of a first mirror array 330. As described with respect to FIG. 1, each mirror in the first mirror array 330 may reflect its respective incident beam onto a selected mirror of a second mirror array 340. The mirrors of the second mirror array 340 may reflect their respective incident beams to form a second set of parallel optical beams 345, of which only the optical beam 345-1 is individually identified. For specific example, the optical beam 325-1 may reflect from a mirror 332 within the first mirror array 330 and may further reflect form a mirror 342 in the second mirror array 340 to become the optical beam 345-1. It can be understood the beams within the second set of optical beams 345 may be the same (ignoring attenuation that may occur as the beams are reflected form the MEMS mirror arrays) as the beams within the first set of optical beams 325, but with the relative spatial locations of the beams reorganized by the action of the first and second mirror arrays 330, 340.

The second optical circulator 350 may operate in the same manner as the first optical circulator 320. Each beam of the second group of optical beams 345 may be incident on Face 2 of the second optical circulator 350 and may exit at Face 3 of the second optical circulator 350. The beams exiting Face 3 of the second optical circulator 350 may be coupled through respective optical collimators and optical fibers to the Group B output connectors, Port B1 out to Port Bn out. These optical fibers and optical collimators are not identified in FIG. 3, but may be recognized with reference to the input optical fibers 314-1 and collimators 316-1. For specific example, the optical beam 345-1 may exit face 3 of the second optical circulator and be coupled to Port B1 out. In similar manner, an optical circuit or path may be established from any one of the Group A input connectors (Port A1 in to Port An in) to any one of the Group B output connectors (Port B1 out to Port Bn out). By properly setting the angles of the mirrors in the first and second mirror arrays 330, 340, n separate circuits can be made between the Group A input connectors and the Group B output connectors.

At the same time as optical circuits are made between the Group A input connectors and the Group B output connectors, circuits are also made between the corresponding Group B input connectors and the Group A output connectors. Optical signals input at the Group B input connectors are coupled by respective optical fibers to respective optical collimators and converted into respective optical beams. These beams may enter the second optical circulator 350 at Face 1 and may exit the second optical circulator at Face 2 as a third set of optical beams 355, or which only optical beam 355-1 is individually identified. The third set of optical beams 355 exiting Face 2 of the second optical circulator 350 may be superimposed on their counterpart beams of the second set of optical beams 345. For example, optical beam 355-1 may be superimposed on optical beam 345-1 propagating in the reverse direction.

Each optical beam of the third set of optical beams 355 may be incident on the same mirror in the second mirror array 340 as the counterpart beam of the second set of optical beams 345. The second mirror array 340 may reflect each beam to the same mirror in the first mirror array 330 as the counterpart beam of the first set of optical beams 325. For example, optical beam 355-1 may reflect from mirror 342 of the second mirror array 340 and further reflect from mirror 322 of the first mirror array 330.

The first mirror array 330 may reflect the beams received from the second mirror array 340 to a fourth set of optical beams 335 incident on Face 2 of the first optical circulator 320. Each beam of the fourth set of optical beams 335 may be superimposed on the counterpart beam of the first set of optical beams 325. As previously described with respect to FIG. 2B, the optical beams of the fourth set of optical beams will exit at Face 3 of the first optical circulator 320. Each output optical beam may be conveyed to a respective B group output connector via a respective output optical collimator and output optical fiber. The output optical fibers, output optical collimators, and output optical beams are not identified in FIG. 3, but may be recognized with reference to the input optical fibers, collimators, and beams 314-1, 316-1, and 318-1.

Thus the optical circuit switch 300 can create up to n selected bidirectional optical connections between the A group ports and the B group ports. Specifically, the optical circuit switch can make an optical connection between any A group input connector and a selected B group output connector, while simultaneously making an optical connection between the corresponding B group input connector and the corresponding A group output connector, using the same optical path (in opposing directions) between the first and second optical circulators. Compared to the optical circuit switch 100 of FIG. 1, the optical circuit switch 300 of FIG. 3 can establish twice as many optical connections using the same MEMS mirror components.

Figure 4:
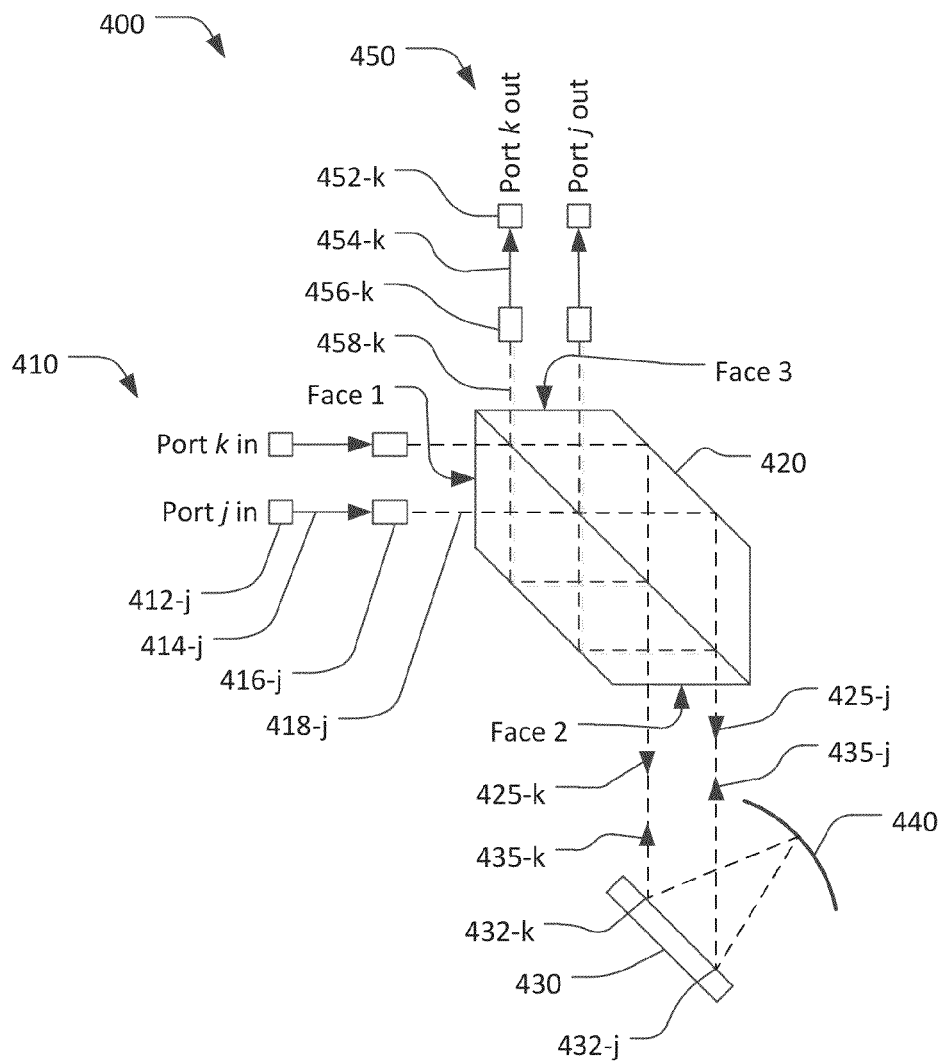
FIG. 4 is an optical schematic diagram of another optical circuit switch with integral optical circulators.

Referring now to FIG. 4, an optical circuit switch 400 may be configured to connect a group of n ports 410, of which Port j in and Port k in are identified, to a group of n output ports 450, of which Port j out and Port k out are identified. n is an integer greater than one, j and k are integers between 1 and n, and j and k are not equal.

Each of the input ports 410 may be a connector (of which only the connector 412-j is identified) to receive an optical fiber cable (not shown). Each connector may be coupled by a respective optical fiber (of which only optical fiber 414-j is identified) to a respective collimator lens (of which only collimator lens 416-j is identified). Each collimator lens may convert an optical signal from the respective optical fiber into a collimated optical beam (of which only optical beam 418-j is identified) in free space. Free space optical beams are shown in FIG. 4 as dashed lines.

Each of the output ports 450 may be a connector (of which only the connector 452-k is identified) to receive an optical fiber cable (not shown). Each connector may be coupled by a respective optical fiber (of which only optical fiber 454-k is identified) to a respective collimator lens (of which only collimator lens 456-k is identified). Each collimator lens may receive a respective collimated optical beam (of which only optical beam 458-k is identified) and focus the optical beam into the respective optical fiber.

First consider an optical signal input to Port j in through a fiber optic cable (not shown) connected to connector 412-j. The optical signal input to Port j in may be converted into optical beam 418-j, which is incident on Face 1 of an optical circulator 420. The optical beam may propagate through the optical circulator 420 as previous described and may exit face 3 of the optical circulator as optical beam 425-j.

Optical beam 425-j may be incident on a 432-j of a mirror array 430. The mirror 432-j may be uniquely associated with Port j, which is to say the optical beam from Port j in is always directed to mirror 432-j. The mirror 432-j may reflect the optical beam to a reflector 440, which in turn reflects the optical beam to another mirror 432-k of the mirror array 430. The mirror 432-k may be uniquely associated with Port k. The mirror 432-k may reflect the optical beam as optical beam 435-k, which is incident on Face 2 of the optical circulator 420.

Optical beam 435-k may propagate through the optical circulator 420 as previously described and may exit face 3 of the optical circulator 420 as optical beam 458-k . Optical beam 458-k may be coupled to Port k out via the collimator lens 456-k, the optical fiber 454-k and the connector 452-k. Thus a connection has been made between Port j in and Port k out.

The angle at which mirror 432-j reflects the incident beam may be controlled by applying one or more voltages to associated electrode to cause the mirror 432-j to rotate about a single axis or two orthogonal axes. In this example, the voltages applied to the electrodes associated with mirror 432-j have caused the mirror to rotate such that the incident beam is reflected to mirror 432-k. Different applied voltages would cause the mirror 432- j to rotate to some other angle and cause the incident beam to be reflected to some other mirror within the mirror array 430.

The angle at which mirror 432-k reflects the incident beam is also controlled by applying one or more voltages to associated electrode to cause the mirror 432-k to rotate about a single axis or two orthogonal axes. In this example, the voltages applied to the electrodes associated with mirror 432-k have caused mirror 432-k to rotate such that the optical beam 435-k is reflected in the required direction to pass through the optical circulator and be coupled to Port k out. Different voltage would cause the mirror 432-k to rotate to some other angle with the result that the desired connection is not made.

Now consider an optical signal input to Port k in. The optical signal input to Port k in may be converted into an optical beam which is incident on Face 1 of the optical circulator 420. The optical beam may propagate through the optical circulator 420 as previously described and may exit face 3 of the optical circulator as optical beam 425-k. Note that optical beam 425-k may be superimposed on optical beam 435-k propagating in the opposite direction.

Optical beam 425-k may be incident on the mirror 432-k of the mirror array 430. The mirror 432-k may reflect the optical beam to the reflector 440, which in turn reflects the optical beam to the mirror 432-j of the mirror array 430. The mirror 432-j may reflect the optical beam as optical beam 435-j, which is incident on Face 2 of the optical circulator 420. Note that optical beam 435-j may be superimposed on optical beam 425-j propagating in the opposite direction.

Optical beam 435-j may propagate through the optical circulator 420 as previously described, may exit face 3 of the optical circulator 420, and may be coupled to Port j out via the respective optical collimator lens, the optical fiber, and connector. Thus a connection has also been made between Port k in and Port j out.

The optical switch 400 may make up to n/2 bidirectional connections between selected pair of ports. Selected ports may be connected by setting the corresponding mirrors in the mirror array 430 to appropriate angles, which may be accomplished by providing appropriate driving voltages to electrodes associated with each mirror. The optical switch 400 may be capable of making the same number of optical connections as the optical circuit switch 100, using only a single MEMS mirror array.

Description of Processes

Figure 5:
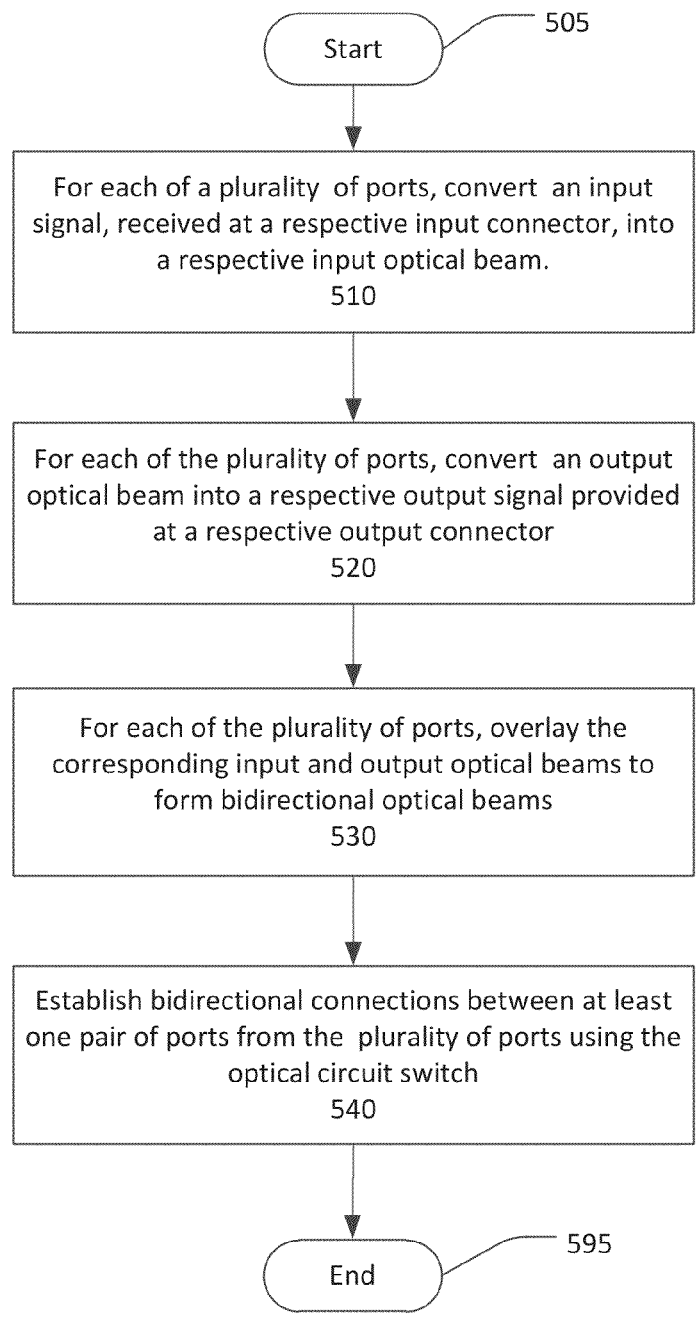
FIG. 5 is a flow chart of a process for optical circuit switching.

FIG. 5 is a flow chart of a process 500 for making optical connections. For ease of discussion, the process 500 is shown as a series of consecutive actions between a start at 505 and an end at 595. However, the process 500 may be continuous and the actions 510-540 occur simultaneously. The process 500 may be performed by an optical circuit switch having a plurality of ports, such as the optical circuit switch 300 or 400. The process may start at 505 when the optical circuit switch is placed into service and may continue until the optical circuit switch is removed from service at 595.

Each port of the optical circuit switch may include an input connector to receive an input signal from a fiber optic cable and an output connector to provide an output signal to a fiber optic cable. At 510, the respective input signal for each of the plurality of ports may be converted into a corresponding input optical beam in free space (i.e. not confined with a waveguide such as an optical fiber). At 520, a corresponding output optical beam may be converted into an output signal for each of the plurality of ports.

At 530, the input optical beam and the output optical beam may be overlaid or superimposed such that the input and output optical beams for each port may follow a common optical path (in opposite directions) through the switching elements of the optical circuit switch. The input and output optical beams may be overlaid, for example, by optical circulators such at the optical circulators 320, 350, and 420.

At 540, optical connections may be established using the optical circuit switch. Connections may be established by applying voltages to set rotation angles of mirrors within mirror arrays, such as the mirror arrays 330, 340, and 440.

Since the input and output beams for each port are overlaid along a common optical path, establishing a connection between the input of a first port and the output of a second port will simultaneously create a connection between the input of the second port and the output of the first port.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An optical circuit switch, comprising:
   a first optical circulator configured to form a first plurality of bidirectional optical beams from a first plurality of input optical beams and a corresponding first plurality of output optical beams, each bidirectional optical beam consisting of the corresponding input optical beam and the corresponding output optical beam overlaid to follow, in opposing directions, a common optical path;
   a first mirror array disposed to reflect the first plurality of bidirectional optical beams;
   a second mirror array disposed to intercept bidirectional optical beams reflected from the first minor array and to reflect at least some of the intercepted bidirectional beams to form a second plurality of bidirectional beams; and
   a second optical circulator configured to separate the second plurality of bidirectional optical beams into a corresponding second plurality of input optical beams and a corresponding second plurality of output optical beams.

2. An optical circuit switch, comprising:
   a first optical circulator configured to overlay N first input optical beams and N corresponding first output optical beams to provide N first bidirectional optical beams, where N is an integer greater than one;
   a first mirror array having at least N mirrors, the mirror array disposed to reflect the N first bidirectional optical beams, each of the N bidirectional optical beams reflecting from a respective one of the at least N minors;
   a second mirror array disposed to intercept at least some of the N first bidirectional optical beams reflected from the mirror array and to reflect the intercepted bidirectional optical beams to provide second bidirectional optical beams; and
   a second optical circulator configured to separate the second bidirectional optical beams into respective second input optical beams and second output optical beams.

3. The optical circuit switch of claim 2, further comprising:
   a first set of N ports, each port including an input connector to receive an input signal and an output connector to provide an output signal;
   a first set of N collimator lenses to respectively convert the input signals from the first set of N ports into the N first input optical beams; and
   a first set of N focusing lenses to respectively convert the N output optical beams into the output signals for the first set of N ports.

4. The optical circuit switch of claim 3, further comprising:
   a second set of ports, each port including an input connector to receive a respective input signal and an output connector to provide a respective output signal;
   a second set of collimator lenses to respectively convert the input signals from the second set of ports into the second input optical beams; and
   a second set of focusing lenses to respectively convert the second set of output optical beams into the output signals for the second set of ports.

5. The optical circuit switch of claim 2, further comprising:
   a controller coupled to the first minor array and to the second mirror array, the controller configured to control rotation angles of at least some mirrors in the first minor array and the second minor arrays to make a bidirectional optical connection between any one of the first set of ports and any one of the second set of ports.

6. A method of switching optical connections, comprising:
   forming a first plurality of bidirectional optical beams from a first plurality of input optical beams and a corresponding first plurality of output optical beams, each bidirectional optical beam consisting of the corresponding input optical beam and the corresponding output optical beam overlaid to follow, in opposing directions, a common optical path;
   reflecting the first plurality of bidirectional optical beams from a first mirror array;
   intercepting the bidirectional optical beams reflected from the first minor array at a second minor array;
   reflecting, by the second minor array, at least some of the intercepted bidirectional beams to form a second plurality of bidirectional beams; and
   separating the second plurality of bidirectional optical beams into a corresponding second plurality of input optical beams and a corresponding second plurality of output optical beams.

7. A method of switching optical connections, comprising:
   overlaying N first input optical beams and N corresponding first output optical beams to provide N first bidirectional optical beams, where N is an integer greater than one;
   reflecting the N first bidirectional optical beams by a first mirror array having at least N mirrors, each of the N bidirectional optical beams reflecting from a respective one of the at least N mirrors;
   intercepting, at a second mirror array, at least some of the N first bidirectional optical beams reflected from the first minor array;

reflecting the intercepted bidirectional optical beams by the second mirror array to provide second bidirectional optical beams; and separating the second bidirectional optical beams into respective second input optical beams and second output optical beams.

8. The method of claim 7, further comprising:

providing a first set of N ports, each port including an input connector to receive an input signal and an output connector to provide an output signal;

respectively collimating the input signals from the first set of N ports to form the N first input optical beams; and respectively focusing the N first output optical beams to form the output signals for the first set of N ports.

9. The method of claim 8, further comprising:

providing a second set of ports, each port including an input connector to receive a respective input signal and an output connector to provide a respective output signal;

respectively collimating the input signals from the second set of ports to form the second input optical beams; and respectively focusing the second set of output optical beams to form the output signals for the second set of ports.

10. The method of claim 9, further comprising:

controlling rotation angles of at least some mirrors in the first mirror array and the second mirror arrays to make a bidirectional optical connection between any one of the first set of ports and any one of the second set of ports.

* * * * *

UNITED STATES PATENT AND TRADEMARK OFFICE
CERTIFICATE OF CORRECTION

| | | |
|---|---|---|
| PATENT NO. | : 9,063,288 B2 | Page 1 of 1 |
| APPLICATION NO. | : 13/904915 | |
| DATED | : June 23, 2015 | |
| INVENTOR(S) | : Shifu Yuan, Nan Luo and Changbao Ma | |

It is certified that error appears in the above-identified patent and that said Letters Patent is hereby corrected as shown below:

In the claims,

Column 9, line 51 : replace "minor" with --mirror--

Column 9, line 67 : replace "minors" with --mirror--

Column 10, line 30 : replace "minor" with --mirror--

Column 10, line 32 : replace "minor" with --mirror--

Column 10, line 33 : replace "minor" with --mirror--

Column 10, line 47 : replace "first minor" with --first mirror--

Column 10, line 47 : replace "second minor" with --second mirror--

Column 10, line 48 : replace "minor" with --mirror--

Column 10, line 65 : replace "minor" with --mirror--

Column 11, line 2 : replace "minor" with --mirror--

Signed and Sealed this
Twenty-fourth Day of November, 2015

Michelle K. Lee
*Director of the United States Patent and Trademark Office*